(12) United States Patent
Kahler et al.

(10) Patent No.: US 9,821,828 B2
(45) Date of Patent: Nov. 21, 2017

(54) FOLDING SHELF CARRIAGE (71) Applicant: Madix, Inc., Terrell, TX (US)

(72) Inventors: Shawn Michael Kahler, Heath, TX (US); Don Richard Doyle, Waverly, AL (US)

(73) Assignee: Madix, Inc., Terrell, TX (US)

(*) Notice: Subject to any disclaimer, the term of this patent is extended or adjusted under 35 U.S.C. 154(b) by 0 days.

(21) Appl. No.: 15/235,848

(22) Filed: Aug. 12, 2016

(65) Prior Publication Data

US 2016/0347340 A1    Dec. 1, 2016

Related U.S. Application Data

(63) Continuation-in-part of application No. 13/955,762, filed on Jul. 31, 2013.

(51) Int. Cl.
| | |
|---|---|
| *B62B 3/02* | (2006.01) |
| *B62B 3/00* | (2006.01) |
| *A47B 43/00* | (2006.01) |
| *A47B 81/00* | (2006.01) |
| *B62B 3/10* | (2006.01) |
| *B62B 3/04* | (2006.01) |

(52) U.S. Cl.
CPC ............... *B62B 3/02* (2013.01); *A47B 43/00* (2013.01); *A47B 81/00* (2013.01); *B62B 3/025* (2013.01); *B62B 3/04* (2013.01); *B62B 3/10* (2013.01)

(58) Field of Classification Search
CPC .. B65B 3/00; B65B 3/02; B65B 3/025; B65B 3/04; B65B 3/10; A47B 43/00; A47B 81/00; A47B 5/13; A47B 5/137
See application file for complete search history.

(56) References Cited

U.S. PATENT DOCUMENTS

| | | | |
|---|---|---|---|
| 1,120,541 | A | 12/1914 | Robinson |
| 3,105,572 | A | 10/1963 | Nesslinger et al. |
| 3,146,892 | A | 9/1964 | White |
| 3,280,989 | A | 10/1966 | Melvin et al. |
| 3,527,174 | A | 9/1970 | Lay |
| 3,827,573 | A | 8/1974 | Guerette |
| 3,861,695 | A | 1/1975 | Shourek et al. |
| 3,861,702 | A | 1/1975 | Wilson |
| 3,920,258 | A | 11/1975 | Lundstrom et al. |
| 3,971,568 | A | 7/1976 | Wright |

(Continued)

FOREIGN PATENT DOCUMENTS

| | | |
|---|---|---|
| DE | 3441881 A1 | 5/1986 |
| DE | 9109137 U1 | 1/1992 |

(Continued)

OTHER PUBLICATIONS

Machine translation of DE9109137 provided by European Patent Office, downloaded Aug. 15, 2016.

(Continued)

*Primary Examiner* — Leslie A Nicholson, III
*Assistant Examiner* — Kimberley S Wright
(74) *Attorney, Agent, or Firm* — Ferguson Braswell Fraser Kubasta PC; John M. Cone; Elizabeth Philip Dahm (57) ABSTRACT

An apparatus for carrying and/or storing shelves which is capable of folding into a compact condition to minimize the footprint of the device when not in use for carrying or storing shelves. The apparatus includes a releasable transverse cross member extending between the side frames to form a base for supporting shelves.

14 Claims, 6 Drawing Sheets

(56) References Cited

U.S. PATENT DOCUMENTS

| | | | |
|---|---|---|---|
| 3,977,529 A | 8/1976 | Stroh | |
| 3,981,510 A | 9/1976 | Gustafsson | |
| 4,159,831 A | 7/1979 | Schorr | |
| 4,678,090 A | 7/1987 | Ross | |
| 4,830,386 A | 5/1989 | Snoke et al. | |
| 4,895,382 A | 1/1990 | Andersson | |
| 5,086,875 A | 2/1992 | Shreve, III | |
| 5,090,725 A | 2/1992 | Feldner | |
| 5,131,547 A | 7/1992 | Goldberg | |
| 5,555,954 A | 9/1996 | Swiderski | |
| 5,685,442 A | 11/1997 | Yoshino et al. | |
| 5,765,702 A | 6/1998 | Bustos et al. | |
| 6,488,160 B2 | 12/2002 | Wang | |
| 6,994,034 B2 | 2/2006 | Chang | |
| RE41,763 E | 9/2010 | Ng | |
| 8,444,232 B2 | 5/2013 | Ceballos-Godefroy | |
| 8,522,987 B2 | 9/2013 | Lim | |
| 8,602,443 B2 | 12/2013 | Moore et al. | |
| 2002/0109441 A1 | 8/2002 | Wang | |
| 2002/0121493 A1 | 9/2002 | Wang | |
| 2003/0151231 A1 | 8/2003 | Calleja | |
| 2005/0034922 A1 | 2/2005 | Wyse | |
| 2005/0103569 A1 | 5/2005 | Winter | |
| 2005/0139131 A1 | 6/2005 | Chen | |
| 2011/0011816 A1 | 1/2011 | Marietta et al. | |
| 2011/0017692 A1 | 1/2011 | Marietta et al. | |
| 2011/0031200 A1 | 2/2011 | Chen | |
| 2011/0120966 A1 | 5/2011 | Salzstein | |
| 2011/0290750 A1 | 12/2011 | Lim | |
| 2012/0312766 A1 | 12/2012 | Butler | |
| 2013/0221818 A1 | 8/2013 | Ceballos Godefroy | |
| 2013/0233811 A1 | 9/2013 | Glover et al. | |

FOREIGN PATENT DOCUMENTS

| | | |
|---|---|---|
| GB | 1298425 A | 12/1972 |
| JP | 2005096635 A | 4/2005 |
| WO | WO9824699 A1 | 6/1998 |
| WO | WO9824699 A1 | 6/1998 |

OTHER PUBLICATIONS

Machine translation of JP2005096635 provided by European Patent Office, downloaded Aug. 15, 2016.

FOLDING SHELF CARRIAGE

CROSS REFERENCE TO RELATED APPLICATION

This application is a continuation of U.S. patent application Ser. No. 13/955,762 filed on Jul. 31, 2013, which issues as U.S. Pat. No. 9,415,788 on Aug. 16, 2016, and which is entitled "FOLDING SHELF CARRIAGE," and which is incorporated by reference in its entirety.

FIELD OF THE DISCLOSURE

The invention relates generally to the field of shelving storage and organization.

BACKGROUND

Many industries utilize shelving for display, organization, and storage of goods, materials and tools. In retail stores, shelving is often used to display goods for sale. In many retail stores, shelving resets are common. For example, shelves may be repositioned on the sales floor to accommodate new merchandising. During these resets, the number of shelves in use may vary. Often retailers need to hide away extra retail shelves that may not be used during certain merchandising. In addition, shelves may become unusable over time due to normal wear and tear or other causes. Accordingly, retail stores may maintain a supply of shelves in storage in a back room or closet.

Moveable carts for storing unconnected shelves facilitate efficiency through mass movement of the shelves during the rearrangement and repositioning of the shelves for merchandising resets. In addition, they may make accommodation of the stored shelving easier within the back room or closet. However, the space within the back room is limited in many retail establishments, and moveable carts often occupy the same amount of space regardless of whether they are empty or holding shelves in storage.

Designs for some display units which might be used for storing shelves include side walls that fold to a position adjacent to the back wall to conserve space when stored. Such displays are not well designed for storing and moving retail shelves and do not include elements sufficient to support an unconnected shelf. Some designs for compactable carts have been developed in which a floor and side walls can be folded to a position adjacent to a back wall to conserve space when stored. Such carts are often bulky because they include a complete floor and have a wide profile to accommodate the folded floor section.

SUMMARY

An improved apparatus for storing and organizing shelves while providing a minimal footprint when not in use is disclosed. The apparatus includes a back, two foldable sides and a transverse support member which can be detachably connected between the two sides to hold them in an open condition to store shelving.

When the apparatus is not in use for storing shelves, it can be folded to create a minimal storage footprint for the apparatus. The transverse support member may be unconnected from one side and moved into a vertical position over the other side. The sides may then fold into a position aligned with the back.

In some embodiments, the frame of the apparatus may be designed from tubular components. In some embodiments, the apparatus does not include any paneling or other material between the structural frame components. For example, the back may be open between horizontal frame components along the back and vertical frame components along the sides.

While the back and sides could be provided by panels, it is preferred that they comprise frame members, such as tubular components.

In some embodiments, the apparatus may include shelf attachment components to support shelves during storage or transport. For example, vertical frame members may include notches or openings, such as vertical slots, which are spaced to accept prongs, hooks, and/or other shelf brackets associated with a shelf. In some embodiments, the transverse frame member and the horizontal lower portions of the side frames create the lower support surface for stacking shelves.

In some embodiments, the apparatus includes wheels or other components to provide mobility to the apparatus. In some embodiments, the apparatus includes a strap or other system to secure the shelving in place.

In various implementations, an apparatus may move and store shelves. The apparatus may include a back, a first side frame, a second side frame, and a transverse frame member. The first side frame may be attached to the back by a first rotatable connection. The first side frame may include a first horizontal frame member located near a bottom of an apparatus and a first vertical frame member extending above said first horizontal frame member. A plurality of first shelf support connections may be disposed along the vertical frame member. A second side frame may be attached to the back by a second rotatable connection. The second side frame may include a second horizontal frame member located near the bottom of said apparatus and a second vertical frame member extending above the first horizontal frame member. A plurality of second shelf support connections may be disposed along the second vertical frame member. The first shelf may be laterally supported by coupling the shelf to first shelf support connection(s) and second shelf support connection(s). The apparatus may include a transverse frame member, which includes a first end and a second opposing end. The transverse frame member may be attached at the first end to the first horizontal frame member by a third rotatable connection, and the transverse frame may be attachable at the second end to the second horizontal frame member by a releasable connection. The apparatus may include vertical adjuster(s) coupled to the back. A vertical adjuster may include a first end, a second opposing end, and a first area disposed between the first end and the second end. The first area may include a plurality of third shelf support connections disposed along the first area. The third shelf support connection(s) may at least partially laterally support a second shelf, which is smaller than each first shelf. The apparatus may transition between an open state and a closed state. In the open state, the transverse frame member may be attached to the second horizontal frame member. In the closed state, the transverse frame member may be disconnected from the second horizontal frame member, and the first side frame and said second side frame may fold inwards toward the back.

Implementations may include one or more of the following features. The apparatus may support the second shelf by coupling the second shelf to at least one of the third shelf supports of one of the vertical adjusters and one or more of the first shelf supports and/or one or more of the second shelf supports. In some implementations, the apparatus may support the second shelf by coupling the second shelf to at least one of the third shelf supports of one of the vertical adjusters and at least one of the third shelf supports of another one of the vertical adjusters. The vertical adjuster(s) may be coupled to the back via one or more fasteners. The vertical adjuster(s) may be removably coupled to the back. In some implementations, the vertical adjuster(s) may be coupled to a back surface of the back such that a front surface of the first area of the vertical adjuster is planar with the front surface of the back. The apparatus may include at least one strap coupleable to the back and the transverse member and capable of at least partially retaining a plurality of shelves laterally supported by the apparatus. The depth between the back and the transverse member may be variable, in some implementations.

In various implementations, an apparatus to move and store shelves may include an upper back frame member, a lower back frame member, two side frames, vertical adjuster(s), and a detachable support member. The upper back frame member may include first coupling member(s) disposed along a length of the upper back frame member, and the lower back frame member may include second coupling member(s) disposed along a length of the lower back frame member. One of the side frames may be foldably connected to an outer end of the upper back frame member and the other side frame is foldably connected to an opposing end of the upper back frame member. Each side frame may be moveable between a closed state substantially adjacent to the upper back frame member and an open state substantially perpendicular to the upper back frame member. A side frame(s) may include a plurality of first openings adapted to receive a protrusion of a first shelf. A first shelf may be at least partially supported laterally by coupling protrusion(s) of the first shelf with one or more of the first openings in each of the side frames. Vertical adjusters may be coupleable to the upper back frame member and the lower back frame member to allow support of a plurality of second shelves. A vertical adjuster may include a first end, a second opposing end, and a first area disposed between the first end and the second end. The first end may include a third coupling member adapted to couple with one of the first coupling members of the upper back frame member. The second end may include a fourth coupling member adapted to couple with one of the second coupling members of the lower back frame member. The first area may include a plurality of second openings. A second opening may receive a protrusion of a second shelf. The second shelf may be at least partially supported laterally by coupling one or more protrusions of the second shelf with one or more second openings in at least one of the vertical adjuster. The second shelf may be smaller than the first shelf. The detachable support member may include a rail that extends between fronts of the two side frames to secure an apparatus in its open position.

Implementations may include one or more of the following features. The first coupling member(s) may include a pair of openings, the second coupling member(s) may include a pair of openings, and the third coupling member(s) may include a pair of openings; and the fourth coupling member(s) may include a pair of openings. The apparatus may include fastener(s) that couple at least one of the first coupling members and the third coupling members, fastener(s) that couple at least one of the second coupling members and the fourth coupling member to secure at least one vertical member to the upper back frame member and the lower back frame member. The side frame(s) may include a plurality of openings; and each of the openings may receive a protrusion of a shelf. A shelf may be supported laterally by coupling one or more protrusions of the shelf with one or more openings of each of the side frames. The second shelf may be supported laterally by coupling one or more of the protrusions of the second shelf with one or more second openings in one of the vertical adjusters and by coupling one or more of the protrusions of the second shelf with one or more of the first openings in one of the side frames. In some implementations, the second shelf may be supported laterally by coupling one or more of the protrusions of the second shelf with one or more second openings in one of the vertical adjusters and by coupling one or more of the protrusions of the second shelf with one or more of the second openings in another one of the vertical adjusters. The apparatus may strap(s) coupleable to the upper back frame and the transverse member. A strap may at least partially retain a plurality of shelves laterally supported by the apparatus.

In various implementations, an apparatus to move and store shelves may include upper and lower back frame members, two side frames, a detachable support member, and mobility components. The side frame(s) may be foldably connected to the respective outer ends of the back frame members and moveable between a closed state substantially adjacent to the back frame members and an open state substantially perpendicular to the back frame members. The side frames may include a plurality of openings adapted to receive a protrusion of a shelf. A shelf may be supported laterally by coupling one or more protrusions of the shelf with one or more openings of each of the side frames. The detachable support member may include a rail that extends between fronts of the two side frames to secure an apparatus in its open position. Mobility component(s) may be coupled to each of the side frames and may provide mobility to the apparatus.

Implementations may include one or more of the following features. In the closed state, the detachable support member may rotate about a rotatable connection to be disposed vertically. The protrusion(s) on the shelf may include a bracket and/or a hook. The apparatus may include at least one strap coupleable to the upper back frame and the detachable support member. A strap may be capable of at least partially retaining a plurality of shelves laterally supported by the apparatus. A side frame may include a side rail. A depth between the side rails may be variable.

A BRIEF DESCRIPTION OF THE DRAWINGS

Embodiments will now be described, by way of example only, with references to the accompanying drawings in which.

Like reference symbols in the various drawings indicate like elements.

DETAILED DESCRIPTION

While this invention may be embodied in many different forms, there will herein be described in detail preferred embodiments of the invention with the understanding that the present disclosure is to be considered as an exemplification of the principles of the invention and is not intended to limit the broad aspects of the invention to the embodiments illustrated. It will be understood that the invention may be embodied in other specific forms without departing from the spirit or central characteristics thereof. The present embodiments, therefore, are to be considered in all respects as illustrative and not restrictive, and the invention is not to be limited to the details given herein. The apparatus for storing and organizing shelves may be referred to as a shelf carriage, trolley and/or cart in this disclosure.

Figure 1:
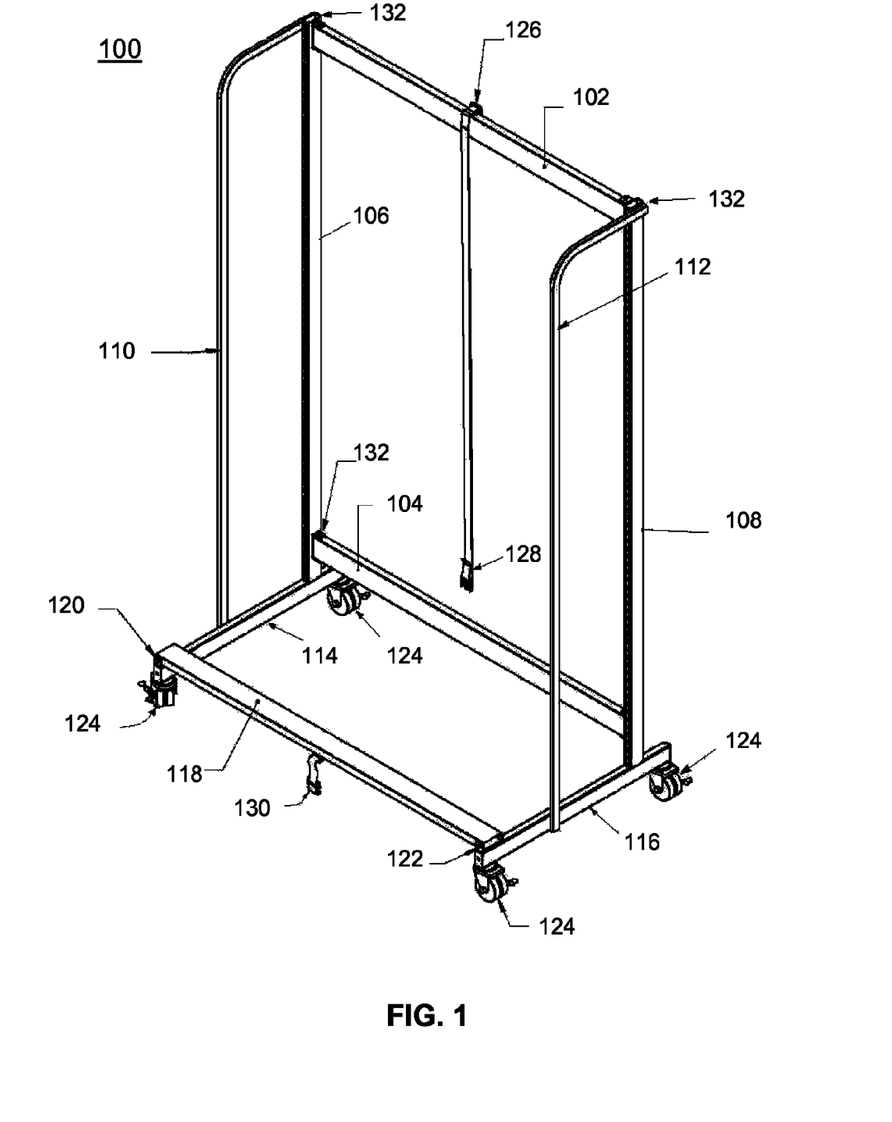
FIG. 1 is a perspective view of an embodiment of a shelf carriage in an open state.

FIG. 1 depicts an embodiment of a shelf carriage 100 in an open state or condition. In the open state, the shelf carriage 100 may be used to store, carry and/or transport one or more shelves.

Shelf carriage 100 comprises a number of frame components defining a back, sides and a bottom. In this embodiment, the back of shelf carriage 100 is defined by the upper back frame member 102 and lower back frame member 104 which are both horizontal frame components. The horizontal back frame members 102 and 104 are attached by hinges 132 at their outer ends to a first vertical frame member 106 and a second vertical frame member 108. The hinges 132 facilitate a structural connection which allows axial movement or rotation of the back frame members 102 and 104 with respect to the vertical frame members 106 and 108. The back in this embodiment is open between horizontal back frame members 102 and 104 and the vertical frame members 106 and 108. In such an embodiment, the weight of the shelf carriage 100 may be minimized by only utilizing frame components necessary for the structure and leaving out components such as a back panel. In other embodiments, a panel, board and/or other material may be included to cover the area between horizontal back frame members 102 and 104 and the vertical frame members 106 and 108. Accordingly, the back may be an open or a closed area defined by the structural frame members.

The components of a first side of the shelf carriage 100 include the first vertical frame member 106, a first vertical side rail member 110 extending toward the front of said shelf carriage 100 and a first horizontal side frame member 114 located near the bottom of the shelf carriage 100. Similarly, the components of a second side of shelf carriage 100 include the second vertical frame member 108, a second vertical side rail member 112 extending toward the front of said shelf carriage 100 and a second horizontal side frame member 116 located near the bottom of the shelf carriage 100.

In the open condition shown in FIG. 1, a transverse frame member 118 extends from the first horizontal side frame member 114 to the second horizontal side frame member 116, and is attached to the first horizontal side frame member 114 by first connection 120 and attached to the second horizontal side frame member 116 by second connection 122. In some embodiments of the shelf carriage 100, first connection 120 and/or second connection 122 may comprise detachable connections.

In the depicted embodiment, the shelf carriage 100 includes a set of four casters 124 which facilitate movement of the shelf carriage 100 which are operatively attached to the first horizontal side frame member 114 and the second horizontal side frame member 116. In addition, FIG. 1 depicts a strap 126 which may be used to secure the shelves to the shelf carriage 100.

In an open state, such as that shown in FIG. 1, the shelf carriage 100 may be used to store and/or carry shelves. In the open state shown, the side components are substantially perpendicular to the back of the shelf carriage 100. In some embodiments, the vertical frame members 106 and 108 are designed such that shelves to be moved or stored are attachable to the vertical frame members 106 and 108 by one or more shelf support connections, such as spaced openings, engaging protrusions, or other connections for attaching a shelf to the shelf carriage. For example, the vertical frame members 106 and 108 may include spaced openings which receive hooks provided on the shelves whereby the hooks of a shelf fit into the spaced openings and engage the vertical frame members 106 and 108 to support the shelf on the shelf carriage 100.

As discussed further below in conjunction with FIG. 4 (depicting an embodiment of shelf carriage 100 in a closed or folded state), the shelf carriage 100 may be folded to minimize the floor footprint in some embodiments by disconnecting the transverse frame member 118 from the second horizontal side frame member 116, and rotating the disconnected transverse frame member 118 to a vertical position. The side components may then be rotated inward to a closed state or condition adjacent to the back of shelf carriage 100 around the hinges 132 which provide a rotatable connection between the horizontal back frame members 102 and 104 and the vertical frame members 106 and 108. This reduces the depth and therefore the overall footprint of the shelf carriage 100 for storage without the shelves.

In some embodiments, one or more back frame members 102 and 104 may be positioned at a variety of heights. In some embodiments, the back may include one or more vertical frame components. In some embodiments, the back may include angular frame components, such as a pair of diagonal members creating the shape of an "X" across the back of the shelf carriage 100. The number of horizontal, vertical and/or angular frame components for the back of shelf carriage 100 may vary.

In some embodiments, the horizontal back frame members 102 and 104 may also be attached such that the height of one or more of the horizontal back frame members 102 and 104 may be variable. For example, the horizontal upper back frame member 102 may be attached to the hinges 132 which allow the horizontal upper back frame member 102 to slide up or down along a portion of the vertical frame members 106 and 108. One skilled in the art will recognize that any connection to the back of shelf carriage 100 that provides for the side frame components to rotate or pivot may be utilized and remain within the scope and spirit of the present disclosure.

In this embodiment, the first vertical side rail member 110 extends vertically upward from the first horizontal side frame member 114 and then curves near the top and extends horizontally to the first vertical frame member 106. In this embodiment, the first vertical side rail member 110 is attached to the outside of the first vertical frame member 106. In addition, the first vertical side rail member 110 is attached to the outside of the first horizontal side frame member 114 approximately halfway between the first vertical frame member 106 and the end of the first horizontal side frame member 114. One skilled in the art will recognize that the placement of connections for the side components may vary and remain within the scope and spirit of the present disclosure. The first horizontal side frame member 114 extends primarily forward from the back of the shelf carriage 100. In some embodiments, the first horizontal side frame member 114 also extends partially behind the back of the shelf carriage 100.

In this embodiment, the second vertical side rail member 112 extends vertically from the second horizontal side frame member 116 upward then curves near the top and extends horizontally to the second vertical frame member 108. In this embodiment, the second vertical side rail member 112 is attached to the outside of the second vertical frame member 108. In addition, the second vertical side rail member 112 is attached to the outside of second horizontal side frame member 116 approximately halfway between the second vertical frame member 108 and the end of the second horizontal side frame member 116. One skilled in the art will recognize that the placement of connections for the side components may vary and remain within the scope and spirit of the present disclosure. The second horizontal side frame member 116 extends primarily forward from the back of the shelf carriage 100. In some embodiments, the second horizontal side frame member 116 also extends partially behind the back of the shelf carriage 100.

In some embodiments, first connection 120 is a rotatable connection, such as a hinge, which facilitates movement of the transverse frame member 118 at least between a near horizontal position and a near vertical position. In some embodiments, second connection 122 is a detachable connection which facilitates a structurally sound connection when said shelf carriage 100 is in an open state, and allows the transverse frame member 118 and the second horizontal side frame member 116 to be disconnected for folding the shelf carriage 100. The type of connections may vary and remain within the scope and spirit of the disclosure. For example, first connection 120 may be a removable connection and second connection 122 may be a rotatable connection. As another example, both connections 120 and 122 may be detachable connections.

The frame members may be connected in a variety of manners including bolts, screws, adhesives, tapes, welds, friction connections, fitted connections, rotatable connections, removable connections and/or other connections. In some embodiments, frame members are combined into singular structures. For example, the second vertical side rail member 112 and the second vertical frame member 108 may be created from a single piece of material. In some embodiments, the frame members described herein may comprise multiple components. For example, the first vertical side rail member 110 may comprise a vertical frame member attached at the bottom to the first horizontal side frame member 114 and at the top to a horizontal frame member which extends and attaches to the first vertical frame member 106. For another example, the first vertical frame member 106 may comprise multiple vertical components which may be stacked to vary the height of the shelf carriage 100.

The frame components may be designed from one or more materials including but not limited to metals, plastics, woods, composite materials, and other materials with sufficient structure for the shelf carriage to operate. In addition the design features of the components may vary for functional and/or aesthetic purposes. In some embodiments, one or more frame members are formed of hollow components, for example tubular materials, in order to reduce the overall weight of the shelf carriage 100. In some embodiments, the component pieces may include "C" shaped framing. One skilled in the art will recognize the materials and/or frame component designs may vary to account for strength, rigidity, flexibility, weight, and other factors and remain within the scope and spirit of the present disclosure.

In some embodiments, the shelf carriage 100 may be dimensioned to correspond with specifically sized shelving. In some embodiments, the shelf carriage 100 may be designed to vary dimensions for use with differently sized shelves. For example, the transverse frame member 118 and the horizontal back frame members 102 and 104 may be adjustable such that the width between side components may be varied to fit different shelf widths. As another example, the horizontal side frame members 114 and 116 may be adjustable to accommodate shelves with different depths.

In some embodiments, the shelf carriage 100 includes mobility components, such as the four casters 124, which facilitate movement of the shelf carriage 100. One skilled in the art will recognize that other mobility components used in conjunction with or instead of one or more of the casters 124, may include other wheels, rails, ball bearings, and other mobility components. In some embodiments, the casters 124 may include a locking feature to prevent movement when locked. In some embodiments, the shelf carriage 100 may incorporate or operate in conjunction with motorized components to facilitate movement of the shelf carriage. For example, a motorized device may be operable to connect to pull and/or push the shelf carriage 100.

In this embodiment, the shelf carriage 100 also includes the strap 126 which is shown approximately in the center of the back portion of shelf carriage 100. The position of the strap 126 may vary due to various design elements including folding characteristics of the shelf carriage 100, the number of straps 126 incorporated in the shelf carriage 100, and/or the design features of the shelves to be stored and/or moved using the shelf carriage 100. In some embodiments, the position of the strap 126 may be variable.

In this embodiment, one end of the strap 126 is attached to the upper back frame member 102 and the other end includes a first strap connection 128. The first strap connection 128 is connectable to second strap connection 130 which is attached to transverse frame member 118. During operation for storing and/or carrying shelving, the strap 126 may be placed over the shelves and attached using an operative connection between the strap connections 128 and 130 in order to secure the shelves to the shelf carriage 100.

In some embodiments, during operation a user may load the shelf carriage 100 by placing a shelf in the bottom of the shelf carriage 100. In some embodiments, the transverse frame member 118 and the top surface of the horizontal side frame members 114 and 116 support the shelf. The front surface of the vertical frame members 106 and 108 prevent the shelf from sliding or falling out the back of shelf carriage 100. The vertical side rail members 110 and 112 prevent the shelf from sliding or falling out the sides of shelf carriage 100. As the user loads additional shelves, each is supported by the shelf below and contained within the area defined by the front surface of the vertical frame members 106 and 108 and the vertical side rail members 110 and 112.

In some embodiments, the user may also secure the shelves in place from the front using the strap 126. The casters 124 make moving the shelf carriage 100 easier during the rearranging process.

In some embodiments, the height of the shelf carriage 100 may be variable. In such embodiments, the height may be set to correspond with the height of the stack of shelves stored or transported on the shelf carriage 100. In some embodiments, the upper back frame member 102 may be variable such that the height of the upper back frame member 102 may be set to facilitate improved operation of the strap 126.

Figure 2:
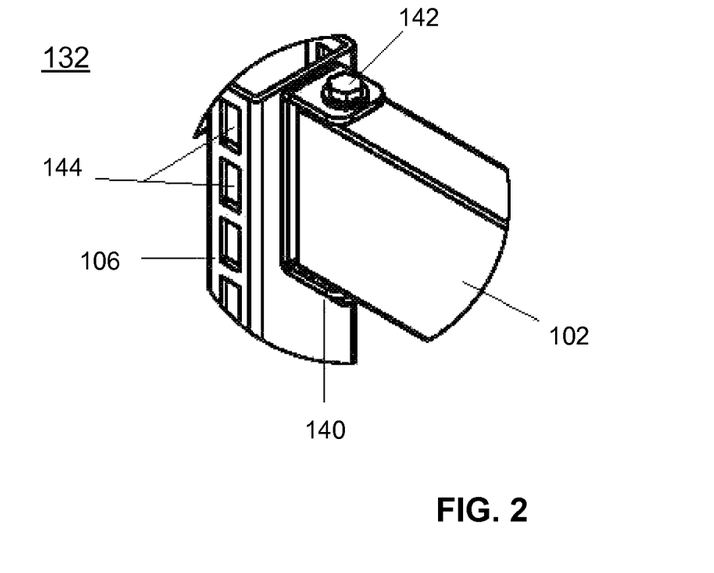
FIG. 2 is an enlarged view of a hinge of the shelf carriage shown in FIG. 1.

FIG. 2 depicts an exploded view of an embodiment of the hinge 132 connecting the first vertical frame member 106 with the upper back frame member 102. In this embodiment, the hinge 132 comprises a hinge bracket 140 and a pin 142. The hinge bracket 140 is shown as a "C" shaped bracket attached to the first vertical frame member 106. In this embodiment, the pin 142 passes through the top and bottom extended portions of the hinge bracket 140 and one end of the upper back frame member 102. The connection allows for axial movement between the first vertical frame member 106 and the upper back frame member 102 around the pin 142 which acts as a pivot point.

The pin 142 may comprise any pin, pole, bolt or other components which may facilitate a rotatable connection between the hinge bracket 140 and the upper back frame member 102. The pin 142 may be a pole, bolt, rod, cylinder or other item which may pass through the extensions of bracket 140 and the end of the upper back frame member 102. In some embodiments, the pin 142 does not pass through both extensions of the bracket 140. For example, the pin 142 may be a treaded connection which may connect with corresponding threads in one extension of the bracket 140.

One skilled in the art will recognize that other hinge or rotatable connection designs and mechanisms may be utilized and remain within the scope and spirit of the present disclosure. For example, instead of the "C" shaped bracket and independent pin, hinge bracket 140 may comprise a "U" shaped bracket wherein one side of the "U" attaches to the first vertical frame member 106 and the second side of the "U" is cylindrical and fits a passage way in the end of the upper back frame member 102.

In some embodiments, the hinge 132 is both rotatable and removable. For example, the upper back frame member 102 may include spring loaded protrusions which may be compressed to connect or disconnect the hinge 132, and the protrusions may be fitted to allow rotation when connected to the hinge 132.

In addition, FIG. 2 shows the shelf support connections as openings 144 located in the front portion of the first vertical frame member 106. In some embodiments, the openings 144 are designed to accept shelf brackets or other protrusions or hooks associated with a shelf to connect the shelf to the shelf carriage 100 and support the shelf when in storage or during transport. Each of the openings 144 may be dimensioned and arranged to receive the distal end of a shelf hook. One skilled in the art will recognize that the design of openings 144 may vary to correspond with the shape and arrangement of one or more shelf brackets associated with the shelves. In some embodiments, other mechanisms and designs for the shelf support connections may be used to hold the shelves while in storage or during transport. In some embodiments, the openings 144 operate to reduce the overall weight of the shelf carriage 100 while maintaining sufficient structure to hold shelves.

In some embodiments, the shelf carriage 100 may be designed such that some shelves may be connected to the shelf carriage 100 and some shelves are supported by either the bottom structure as discussed above and/or upon the connected shelves. In some embodiments, the shelves may be secured from the front using strap 126.

Figure 3:
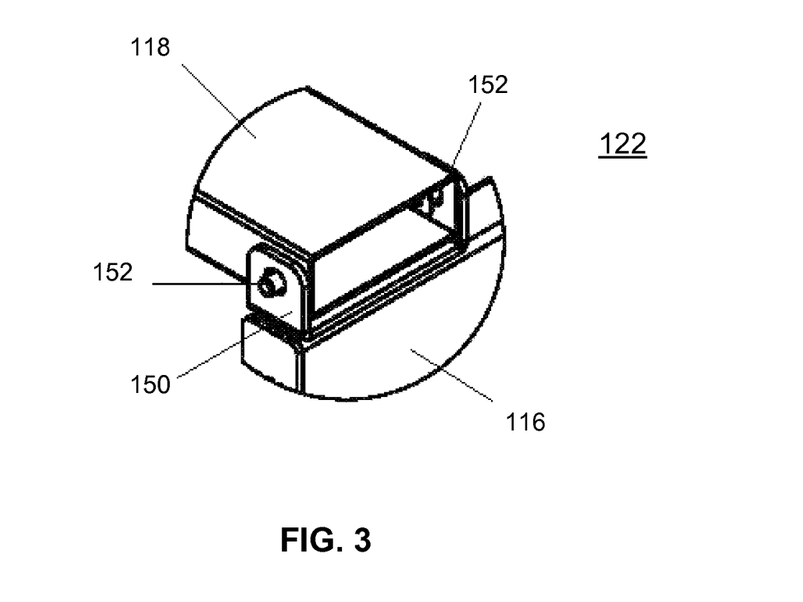
FIG. 3 is an enlarged view of a removable connection of the shelf carriage shown in FIG. 1.

FIG. 3 depicts an exploded view of an embodiment of the second connection 122 connecting the transverse frame member 118 with the second horizontal side frame member 116. In this embodiment, the second connection 122 is a detachable connection comprising a bracket 150 and a set of push buttons 152. One skilled in the art will recognize that the push buttons 152 may comprise any compressible protrusions or other mechanism which may operate as a detachable connection. The bracket 150 is shown as a "C" shaped bracket attached to the second horizontal side frame member 116. In this embodiment, the push buttons 152 are integrated into at least one end of transverse frame member 118. When the push buttons 152 are not compressed, they engage passages in the extended portions of bracket 150 and secure the transverse frame member 118 with the second horizontal side frame member 116. When the push buttons 152 are compressed, they may disengage the passages in the extended portions of bracket 150 and allow the transverse frame member 118 to be disconnected from the second horizontal side frame member 116.

One skilled in the art will recognize that other designs and mechanisms for removable or detachable connections may be utilized for second connection 122 and remain within the scope and spirit of the present disclosure. For example, the second connection may comprise a pair of complimentary fitted components—such as an upward "C" shaped bracket on the second horizontal side frame member 116 and a downward "C" shaped bracket on the transverse frame member 118—which use gravity and the weight of the stored shelves to hold the frame together.

Figure 4:
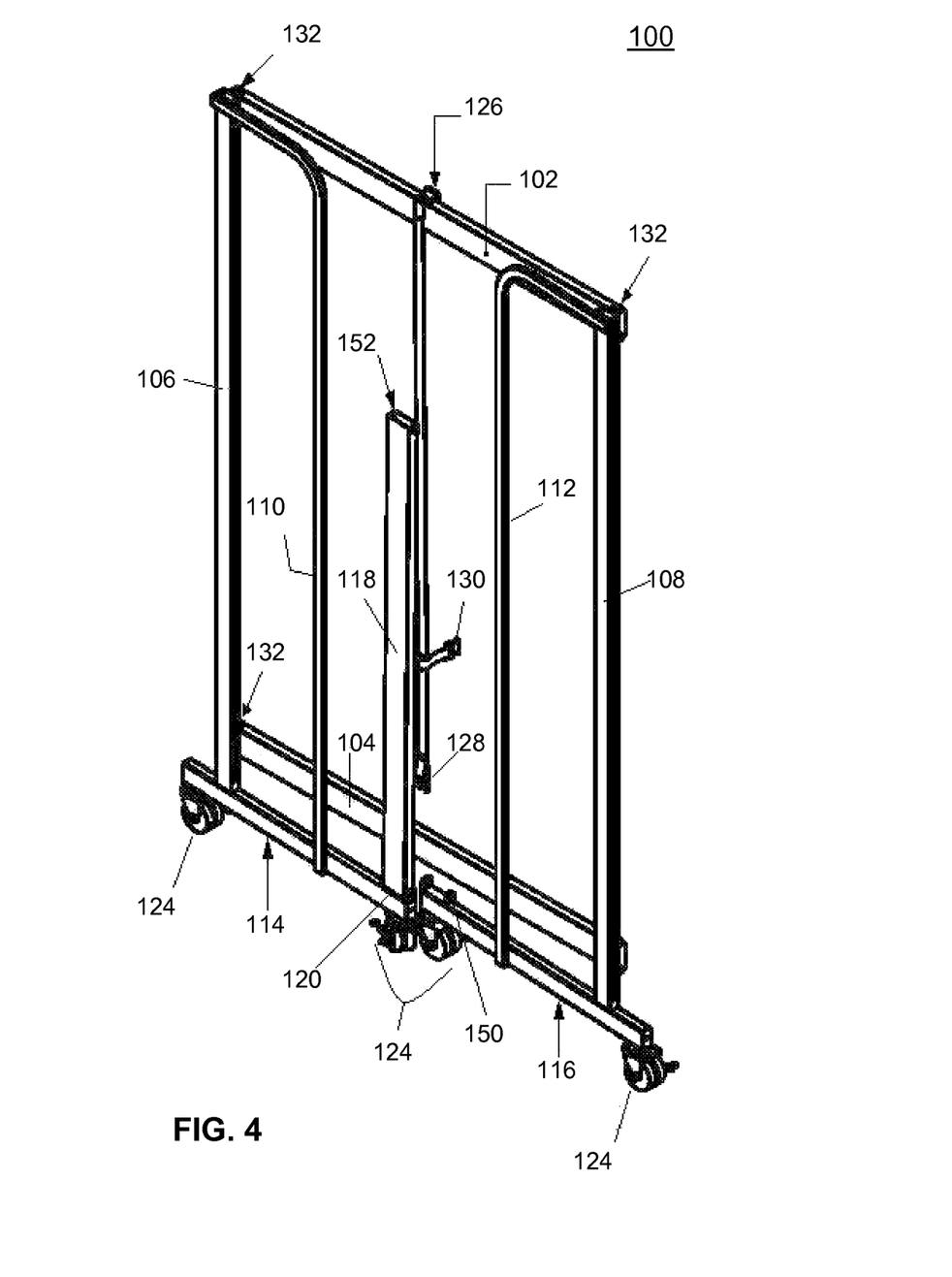
FIG. 4 a perspective view of an embodiment of a shelf carriage in a folded state.

FIG. 4 depicts an embodiment of shelf carriage 100 in a closed or folded state. In this embodiment, the shelf carriage 100 is folded to minimize the floor footprint. The transverse frame member 118 has been disconnected from the second horizontal side frame member 116. In this embodiment, the second connection 122 is disconnected such that the bracket 150 and protrusions of the push buttons 152 are no longer engaged to hold the frame in the open state. The disconnected transverse frame member 118 is rotated to a vertical position at first connection 120 which is a rotatable connection in this embodiment. The side components are rotated inward to the back of shelf carriage 100 around the hinges 132 which provide a rotatable connection between the horizontal back frame members 102 and 104 and the vertical frame members 106 and 108. This reduces the depth and therefore the overall footprint of the shelf carriage 100 for storage without the shelves.

In some embodiments, the height of the shelf carriage 100 may also be variable. For example, the vertical components of the shelf carriage 100 may consist of vertical components that may slide up and down as needed. In such embodiments, the overall area of the shelf carriage 100 may be further reduced and the shelf carriage 100 may fit in locations with lower clearance. For example, a section of inventory storage in a back room may have shelving which allows the shelf carriage 100 to be stored under additional stored inventory.

During operation the user may remove the stored shelves from the shelf carriage 100 and elect to collapse the shelf carriage 100 to minimize the footprint of the shelf carriage 100 for storage. In order to collapse the shelf carriage, the user disconnects the transverse frame member 118 from the second horizontal side frame member 116. In this embodiment, the user may push the push buttons 152 of the second connection 122 and disengage the bracket 150 and the push buttons 152. The user then rotates the transverse frame member 118 into a vertical position around the pivot point defined by first connection 120. The user then rotates the side components inward to the back of shelf carriage 100 around the hinges 132 which provide a rotatable connection between the horizontal back frame members 102 and 104 and the vertical frame members 106 and 108.

In some embodiments, the shelf carriage 100 will include a locking mechanism to hold the shelf carriage 100 in the folded position. For example, hinges 132 may include one or more latches that hold the shelf carriage 100 in the folded position. For another example, the shelf carriage 100 may include a removable strap that stretches from first vertical frame member 106 to second vertical frame member 108 around the transverse frame member 118 and the side components to hold the shelf carriage 100 in the folded position.

Figure 5:
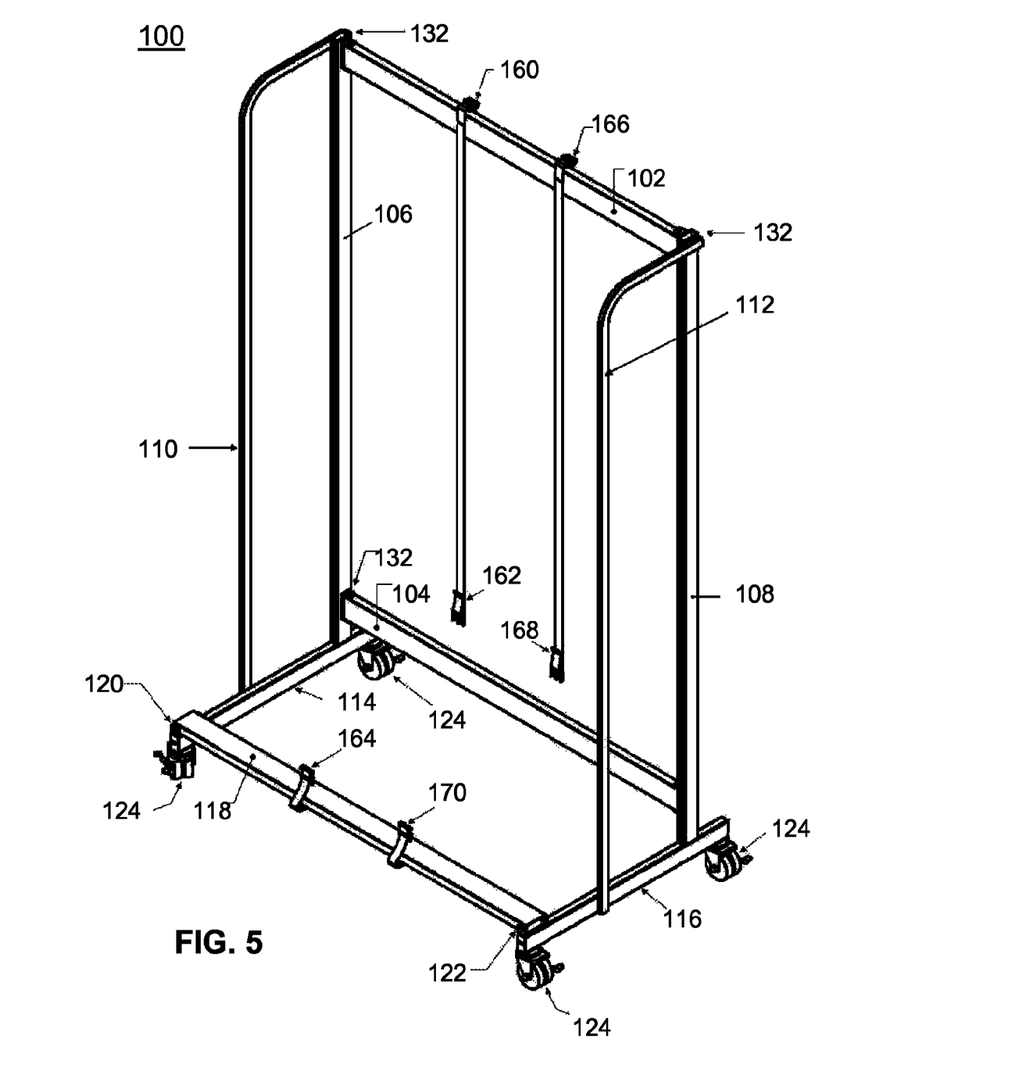
FIG. 5 is a perspective view of another embodiment of a shelf carriage in an open state.

FIG. 5 depicts another embodiment of shelf carriage 100 in an open state. In this embodiment, the shelf carriage 100 includes a first strap 160 and a second strap 166. The first strap 160 and the second strap 166 are shown spaced apart and attached to the upper back frame member 102. At the other end of the first strap 160 from the upper back frame member 102 is a strap connection 162 which is connectable to a base strap connection 164 which is attached to transverse frame member 118. At the other end of the second strap 166 from the upper back frame member 102 is a strap connection 168 which is connectable to a base strap connection 170 which is attached to transverse frame member 118. During operation for storing and/or carrying shelving, the straps 160 and 166 may be placed over the shelves and attached using an operative connection between on the one hand the strap connections 162 and 168 and on the other hand the base strap connections 164 and 170 in order to secure the shelves to the shelf carriage 100.

As an example, an apparatus for storing shelves may comprise a back and two side members each foldably connected to a respective side of the back and moveable between a folded condition substantially adjacent to the back and an open condition substantially perpendicular to the back and a detachable support member adapted, when the apparatus is in the open condition, to extend between the two sides members at a position remote from the back to secure the apparatus in its open position.

Figure 6:
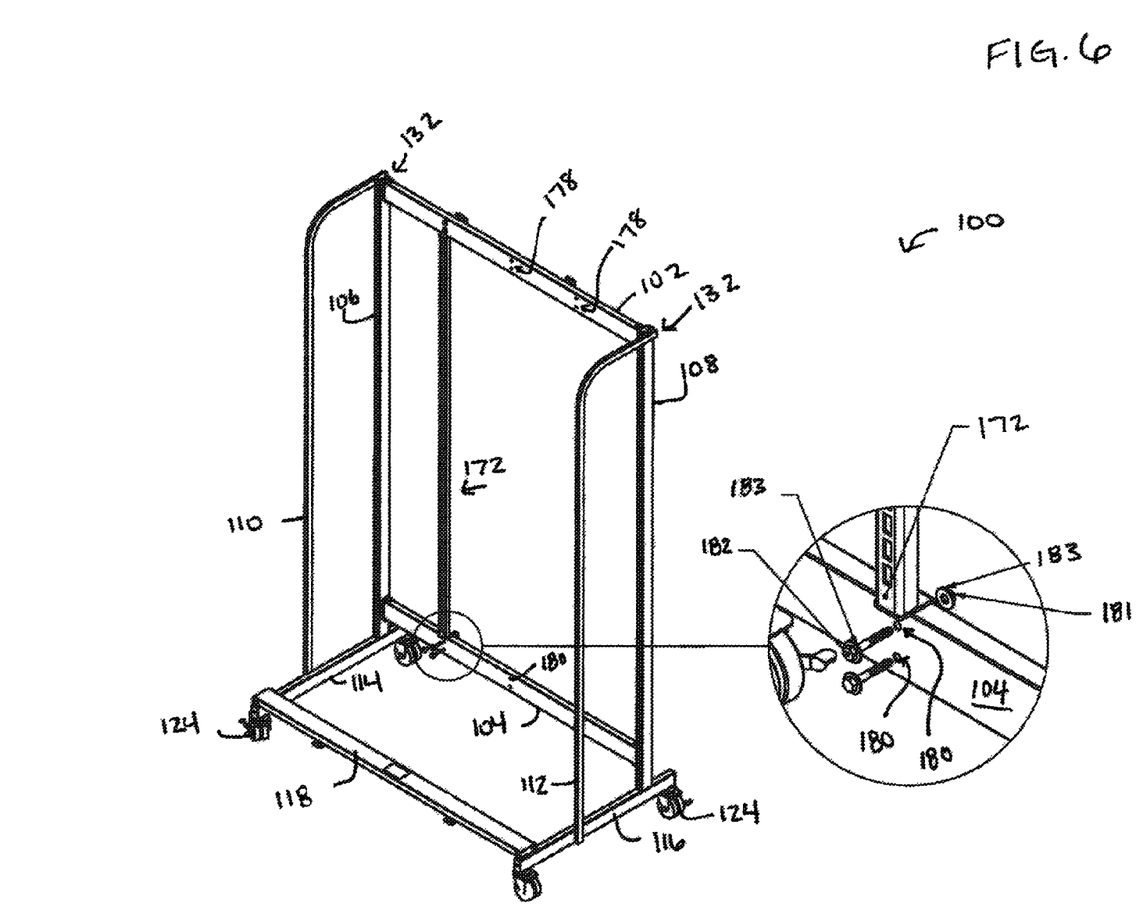
FIG. 6 illustrates a perspective view of an embodiment of a shelf carriage in an open state that allows vertical adjusters.
Figure 7A:
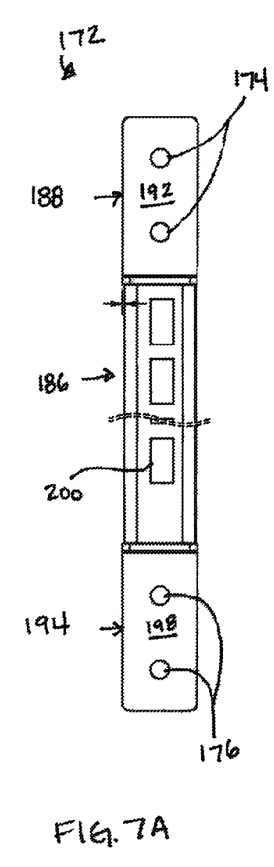
FIG. 7A illustrates a front view of an embodiment of a vertical adjuster.
Figure 7B:
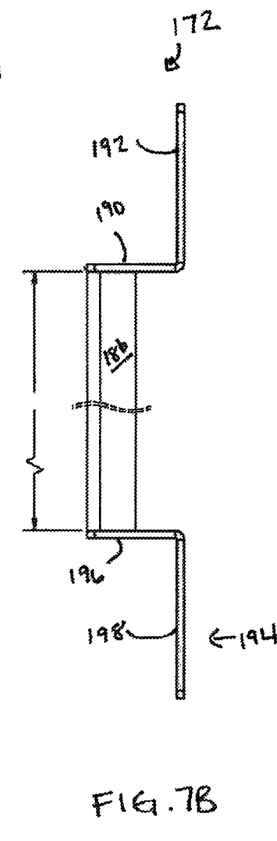
FIG. 7B illustrates a side view of the embodiment of the vertical adjuster illustrated in FIG. 7A.
Figure 7C:
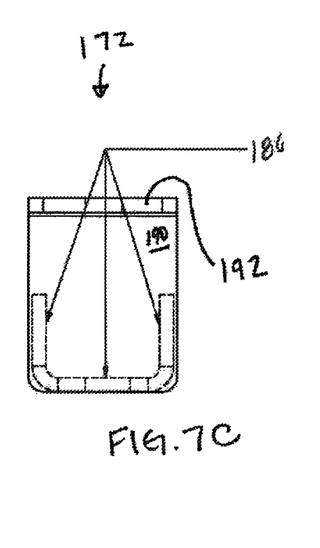
FIG. 7C illustrates a top view of the embodiment of the vertical adjuster illustrated in FIG. 7A.
Figure 7D:
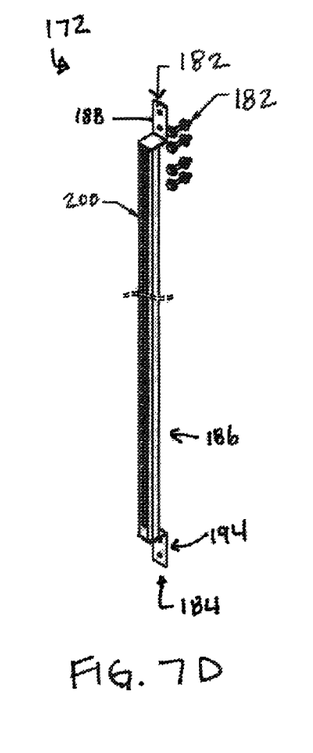
FIG. 7D illustrates a front perspective view of the embodiment of the vertical adjuster illustrated in FIG. 7A.

In some implementations, more than one size of shelf may be laterally supported by the shelf carriage. For example, vertical adjusters may utilized with a shelf carriage to allow shelves shorter than a first sized shelf (e.g., supported by vertical frame members) to be coupled to the shelf carriage. FIG. 6 illustrates an implementation of an example shelf carriage that allows coupling of one or more vertical adjusters. FIGS. 7A illustrates a front view of a vertical adjuster, and FIG. 7B illustrates a side view of the vertical adjuster. FIG. 7C illustrates a top view of the vertical adjuster, and FIG. 7D illustrates a front perspective view of the vertical adjuster.

As illustrated, the shelf carriage 100 may include back frame member(s), vertical frame member(s) and a transverse member 118. A first vertical frame member 106 may be coupled (e.g., via a hinge 132) proximate a first end to an upper back frame member 102 and proximate a second end to a lower back frame member 104 (e.g., via a hinge similar to hinge 132). A second vertical frame member 108 may be coupled (e.g., via a hinge 132) proximate a first end to an upper back frame member 102 and proximate a second end to a lower back frame member 104 (e.g., via a hinge similar to hinge 132). Utilizing hinges to couple the vertical frame members 106, 108 to the back frame members 102, 104 may allow the shelf carriage to be folded and unfolded (e.g., between an open position and a closed position). The shelf carriage 100 may include a first vertical side frame member 110 coupled proximate the first end of the first vertical frame member 106 and a second vertical side frame member 112 coupled proximate the first end of the second vertical frame member 108.

A first horizontal side frame member 114 may be coupled to the first vertical frame member 106 and the first vertical side frame member 110 proximate the lower back frame member 104. In some implementations, the first side vertical member 110 may be coupled to the first horizontal side member between the first end and the second end of the first horizontal side member. For example, the first vertical side member may be positioned such that an end of a shelf coupled to the first vertical member is proximate the first vertical side member (e.g., the vertical side member may contact and/or facilitate retention by inhibiting laterally sliding of a shelf).

A second horizontal side frame member 116 may be coupled to the second vertical frame member 108 and the second vertical side frame member 112 proximate the lower back frame member 104. In some implementations, the second side vertical member 112 may be coupled to the second horizontal side member between the first end and the second end of the second horizontal side member. For example, the first vertical side member may be positioned such that an end of a shelf coupled to the second vertical member is proximate the second vertical side member (e.g., the second vertical side member may contact and/or facilitate retention by inhibiting laterally sliding of a shelf).

In some implementations, when a first side of the shelf carriage folds and unfolds, the first vertical frame member, first vertical side member, first horizontal side member, and transverse frame member may rotate together (e.g., as a unit). When the second side of the shelf carriage folds and unfolds, the second vertical frame member, second vertical side member, and the second horizontal side member may rotate together (e.g., as a unit). The transverse member 118 may be coupled to the first horizontal side member to allow the transverse member to rotate at least partially about the connection (e.g., to allow the transverse member to be disposed parallel with the vertical frame member when folded). The transverse member may be coupled to the second horizontal member via a bracket 150 and push button 152 that allows the transverse member to be releaseably connected to the second horizontal member. For example, when the shelf carriage is disposed in an open position, the transverse member may be coupled to the second horizontal side frame member and disposed approximately parallel to the lower back frame member and/or approximately perpendicular to the first and second vertical side frame member. When the shelf carriage is folded to the closed position, the push button may be depressed to release the coupling of the transverse member and the second horizontal side frame member. The transverse member may then be rotated (e.g., upwards towards the upper back frame member) to allow folding.

In various implementations, the vertical frame members 106, 108 may include openings 144 to couple with shelf brackets, protrusions or hooks (e.g., to couple with and/or support a first shelf). The shelf carriage may allow coupling and/or support of a plurality of sizes of shelves. For example, the frame or portions thereof (e.g., back members and/or transverse member) may be adjustable. In some implementations, vertical adjusters may be utilized to allow coupling of one or more other sized shelves (e.g., compared with the first shelf that has a dimension to allow coupling with openings in the first vertical frame member and the second vertical frame member). Use of the vertical adjusters may allow more than one size of shelf to be coupled to the same shelf carriage at the same time (e.g., since the vertical adjuster may not inhibit use of the openings in the first and/or second vertical members).

The vertical adjuster may include a first end 182 and a second end 184. The vertical adjuster may be coupled to the upper back frame member proximate a first end 182 and may be coupled to the lower back frame member proximate a second end 184. As illustrated, the vertical adjuster 172 may include a first vertical adjuster connection 174 coupleable to the upper back frame connection 178 and a second vertical adjuster connection 176 coupleable to the lower back frame connection 180. For example, the upper back frame member 104 may include one or more upper back frame connections 178 disposed along a length of the upper back frame member; and the lower back frame member 104 may include one or more lower back frame connections 180 disposed along a length of the lower back frame member.

Fasteners 182 may be utilized to couple the vertical adjuster to the back frame members. The fasteners may allow the vertical adjuster to be removably coupled to the back frame members. For example, the fastener 182 may include a bolt, washers 183, and a nut 181 and/or any other appropriate fastener system. As illustrated, the bolt may be disposed through the openings of a vertical adjuster connection and a back frame connection. A washer may be disposed proximate a first end of the bolt, which is proximate the bolt head and/or a unibody washer and bolt head may be utilized. A washer 183 and a nut may be used on an opposing side of the bolt to retain the bolt and couple the vertical adjuster to a back frame member.

In some implementations, the vertical adjuster may include a flange disposed at each end of the vertical adjuster. The flanges 188, 194 may allow the vertical adjuster to be coupled to the back frame members 102, 104 such that the vertical adjuster may be disposed in approximately the same plane as the vertical frame members 114, 116. In some implementations, the flanges may allow the vertical adjuster to be positioned such that the vertical adjuster does not inhibit use of the vertical frame members to couple shelves to the shelf carriage (e.g., a shelf may be disposed across the vertical adjuster and couple proximate a first end with the first vertical frame member and proximate a second opposing end with the second vertical frame member).

As illustrated, a first flange 188 may be disposed proximate a first end 182 of the vertical adjuster 172. The first flange 188 may include a first arm 190 and a second arm 192. The second flange 194 may be disposed proximate a second end 184 of the vertical adjuster 172. The second flange 194 may include a first arm 196 and a second arm 198. The first arm and the second arm of the flanges 188, 194 may be approximately perpendicular with respect to each other in some implementations. The first arm of a flange 188, 194 may contact and/or be disposed proximate a first surface of the back member. For example, the first area may be 186 may be approximately planar with the front surface of the back frame member(s). The second arm of a flange 188, 194 may contact and/or be disposed proximate a second adjacent surface of the same back member. The second arm 192, 196 may include the vertical adjuster connections (e.g., openings). 174, 176.

The vertical adjuster may include a first area 186 disposed between the first end 182 and the second end 184. The first area 186 may include one or more openings 200 to allow a shelf to be coupled to the shelf carriage. The openings 200 may be similar to the openings 144 in the vertical frame members, for example, to allow both openings to be used in conjunction with the same shelf type. In some implementations, a plurality of openings may be disposed along a height of the vertical adjuster (e.g., to allow a plurality of shelves to be coupled to the shelf carriage). The openings 200 may receive shelf brackets, protrusions, and/or hooks associated with a shelf. The openings 200 may allow a shelf to be coupled to the vertical adjuster and at least partially supported.

The vertical adjuster 172 may be coupled to the upper and lower back frame members based on a size of a shelf to be coupled to the shelf carriage. In some implementations, more than one vertical adjuster 172 may be coupled to the shelf carriage. For example, the upper back frame member and the lower back frame member may include sets of openings that correspond to the back frame connections 176, 178. The sets of openings may be disposed along a length of the back frame members to allow a distance between a vertical frame member 106, 108 and the vertical adjuster(s) 172 to be set (e.g., to an appropriate distance for a shelf to be transported by the shelf carriage).

In some implementations, during use, one or more first shelves may be coupled to the shelf carriage via the first vertical frame member and the second vertical frame member. For example, a first end of a first shelf (e.g., shelf brackets) may be coupled to the first vertical frame member and a second opposing end of the first shelf may be coupled to the second vertical frame member. Thus, a first shelf may be coupled and supported by the shelf carriage. One or more second shelves, which are smaller than the first shelves, may also be coupled to the same shelf carriage (e.g., with or without a first shelf coupled to the first shelf carriage). A first end of a second shelf may be coupled to a vertical adjuster and a second opposing end of the second shelf may be coupled to the first vertical frame member or the second vertical frame member. Thus, a second shelf may be coupled and/or supported by the shelf carriage. One or more second shelves may be coupled to the shelf carriage via the vertical adjuster and the first vertical frame member and/or via the vertical adjuster and the second vertical frame member. In some implementations, a shelf carriage may include more than one vertical adjuster and a shelf may couple (e.g., at a first end) to a first vertical adjuster and may couple (e.g., at a second opposing end) to a second vertical adjuster to allow the shelf to be coupled to the shelf carriage. In some implementations, a shelf carriage may allow more than one size of shelf to be carried via the same shelf carriage which may facilitate operation, increase user satisfaction (e.g., since multiple carriages may be utilized), and/or lower operation costs (e.g., due to versatility of the shelf carriage).

In some implementations, a shelf may include intermediate shelf brackets, protrusions, and/or hooks that are not proximate an end of the shelf. One or more of the intermediate shelf couplings (e.g., brackets, protrusions, and/or hooks) may be coupled to the vertical adjuster, for example, to provide additional stability.

The invention being thus described and further described in the claims, it will be obvious that the same may be varied in many ways. Such variations are not to be regarded as a departure from the spirit and scope of the invention and all such modifications as would be obvious to one skilled in the art are intended to be included within the scope of the apparatus and method described.

The invention claimed is:

1. An apparatus to move and store shelves, the apparatus comprising
a back;
a first side frame attached to the back by a first rotatable connection, wherein the first side frame comprises:
a first horizontal frame member located near a bottom of an apparatus; and
a first vertical frame member extending above the first horizontal frame member;
a plurality of first shelf support connections disposed along the vertical frame member;
a second side frame attached to the back by a second rotatable connection, wherein the second side frame comprises:
a second horizontal frame member located near the bottom of the apparatus; and
a second vertical frame member extending above the first horizontal frame member;
a plurality of second shelf support connections disposed along the second vertical frame member, wherein the first shelf is laterally supported by coupling the shelf to at least one of the first shelf support connections and at least one of the second shelf support connections;
a transverse frame member comprising:
a first end; and
a second opposing end;
wherein the transverse frame member is attached at the first end to the first horizontal frame member by a third rotatable connection, and wherein the transverse frame is attachable at the second end to the second horizontal frame member by a releasable connection;
one or more vertical adjusters coupled to the back, wherein each vertical adjuster comprises:
a first end;
a second opposing end; and
a first area disposed between the first end and the second end, wherein the first area comprises a plurality of third shelf support connections disposed along the first area, and wherein each of the third shelf support connections is capable of at least partially laterally support a second shelf, wherein the second shelf is smaller than each first shelf;
wherein the apparatus is capable of transitioning between an open state and a closed state; and wherein in the open state, the transverse frame member is attached to the second horizontal frame member; and wherein in the closed state, the transverse frame member is disconnected from the second horizontal frame member; and wherein the first side frame and the second side frame fold inwards toward the back, in the closed state.

2. The apparatus of claim 1 wherein the apparatus is capable of supporting the second shelf by coupling the second shelf to at least one of the third shelf supports of one of the vertical adjusters and at least one of:
one or more of the first shelf supports
or one or more of the second shelf supports.

3. The apparatus of claim 1 wherein the apparatus is capable of supporting the second shelf by coupling the second shelf to at least one of the third shelf supports of one of the vertical adjusters and at least one of the third shelf supports of another one of the vertical adjusters.

4. The apparatus of claim 1 wherein one or more of the vertical adjusters is coupled to the back via one or more fasteners.

5. The apparatus of claim 1 wherein one or more of the vertical adjusters are removably coupled to the back.

6. The apparatus of claim 1 wherein each of the vertical adjusters is coupled to a back surface of the back such that a front surface of the first area of the vertical adjuster is planar with the front surface of the back.

7. The apparatus of claim 1 further comprising at least one strap coupleable to the back and the transverse member, wherein each strap is capable of at least partially retaining a plurality of shelves laterally supported by the apparatus.

8. The apparatus of claim 1 wherein the depth between the back and the transverse member is variable.

9. An apparatus to move and store shelves comprising:
upper back frame member, wherein the upper back frame member comprises one or more first coupling members disposed along a length of the upper back frame member;
lower back frame member, wherein the lower back frame member comprises one or more second coupling members disposed along a length of the lower back frame member;
two side frames, wherein one of the side frames is foldably connected to an outer end of the upper back frame member, and wherein an other side frame is foldably connected to an opposing end of the upper back frame member, and wherein each side frame is moveable between a closed state substantially adjacent to the upper back frame member and an open state substantially perpendicular to the upper back frame member; and wherein each of the side frames includes a plurality of first openings; and wherein each of the first openings is adapted to receive a protrusion of a first shelf; and wherein the first shelf is at least partially supported laterally by coupling one or more protrusions of the first shelf with one or more of the first openings in each of the side frames; and
one or more vertical adjusters coupleable to the upper back frame member and the lower back frame member to allow support of a plurality of second shelves, wherein each vertical adjuster comprises:
a first end, wherein the first end comprises a third coupling member adapted to couple with one of the first coupling members of the upper back member;
a second opposing end, wherein the second end comprises a fourth coupling member adapted to couple with one of the second coupling members of the lower back member;
a first area disposed between the first end and the second end of the vertical adjuster, wherein the first area comprises a plurality of second openings; and wherein each of the second openings is adapted to receive a protrusion of a second shelf; and wherein the second shelf is at least partially supported laterally by coupling one or more protrusions of the second shelf with one or more second openings in at least one of the vertical adjuster; and wherein the second shelf is smaller than the first shelf; and
a detachable support member comprising a rail that extends between fronts of the two side frames to secure an apparatus in its open position.

10. The apparatus of claim 9 wherein each of the first coupling members comprises a pair of openings; and wherein each of second coupling member comprises a pair of openings, wherein the third coupling member comprises a pair of openings; and wherein the fourth coupling member comprises a pair of openings; and further comprising fasteners, and wherein one or more of the fasteners couple at least one of the first coupling members and the third coupling members and one or more of the fasteners couple at least one of the second coupling members and the fourth coupling member to secure at least one vertical member to the upper back frame member and the lower back frame member.

11. The apparatus of claim 9 wherein each of the side frames includes a plurality of openings; and wherein each of the openings is adapted to receive a protrusion of a shelf; and wherein a shelf is supported laterally by coupling one or more protrusions of the shelf with one or more openings of each of the side frames.

12. The apparatus of claim 9 wherein the second shelf is supported laterally by coupling one or more of the protrusions of the second shelf with one or more second openings in one of the vertical adjusters and by coupling one or more of the protrusions of the second shelf with one or more of the first openings in one of the side frames.

13. The apparatus of claim 9 wherein the second shelf is supported laterally by coupling one or more of the protrusions of the second shelf with one or more second openings in one of the vertical adjusters and by coupling one or more of the protrusions of the second shelf with one or more of the second openings in another one of the vertical adjusters.

14. The apparatus of claim 9 further comprising at least one strap coupleable to the upper back frame and the transverse member, wherein each strap is capable of at least partially retaining a plurality of shelves laterally supported by the apparatus.

* * * * *

UNITED STATES PATENT AND TRADEMARK OFFICE
CERTIFICATE OF CORRECTION

| | | |
|---|---|---|
| PATENT NO. | : 9,821,828 B2 | Page 1 of 1 |
| APPLICATION NO. | : 15/235848 | |
| DATED | : November 21, 2017 | |
| INVENTOR(S) | : Shawn Michael Kahler and Don Richard Doyle, Jr. | |

It is certified that error appears in the above-identified patent and that said Letters Patent is hereby corrected as shown below:

The inventor name listed as -Don Richard Doyle- should read:
-- Don Richard Doyle, Jr. --

Signed and Sealed this
Twelfth Day of December, 2017

Joseph Matal
*Performing the Functions and Duties of the*
*Under Secretary of Commerce for Intellectual Property and*
*Director of the United States Patent and Trademark Office*